UNITED STATES PATENT OFFICE.

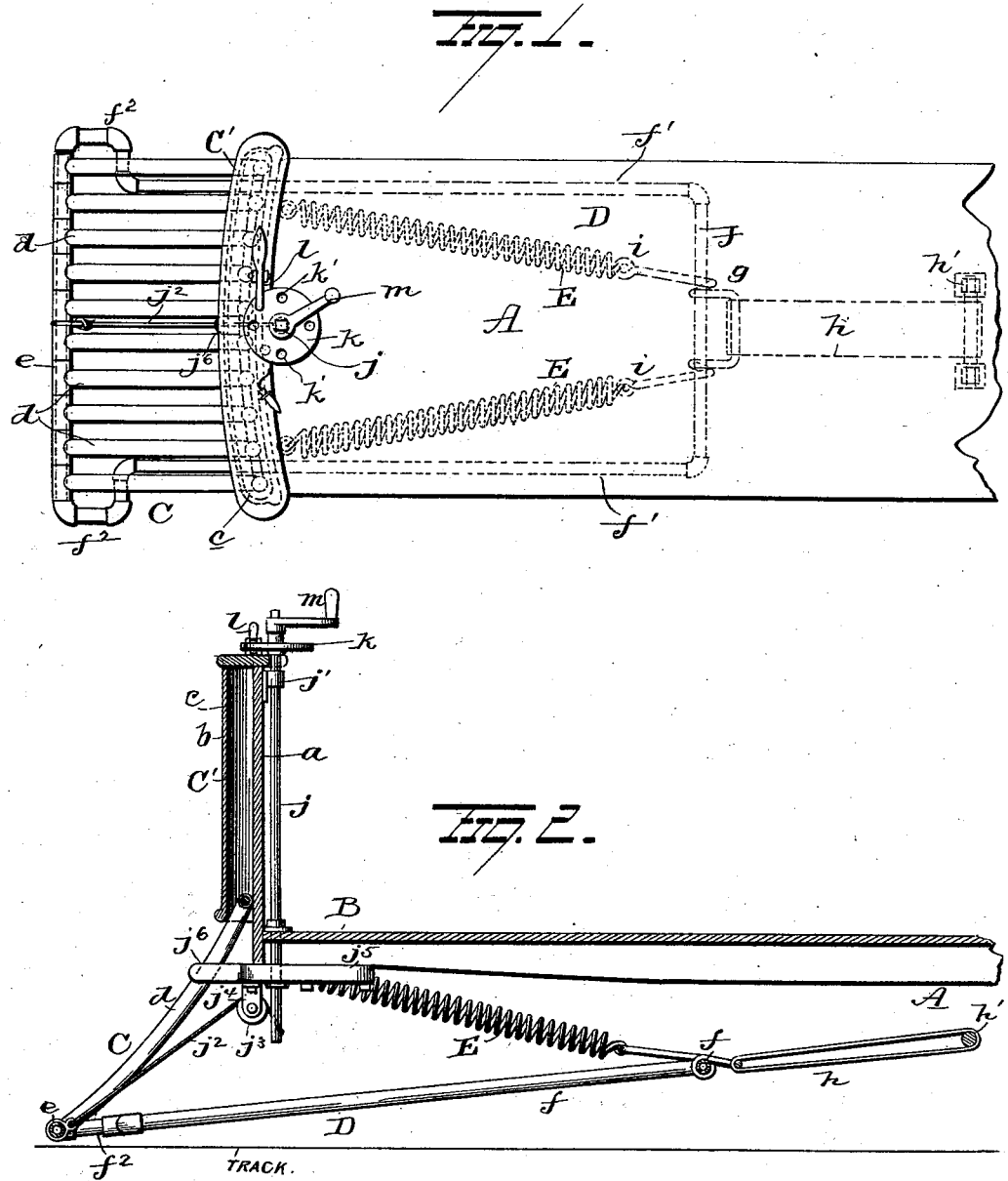

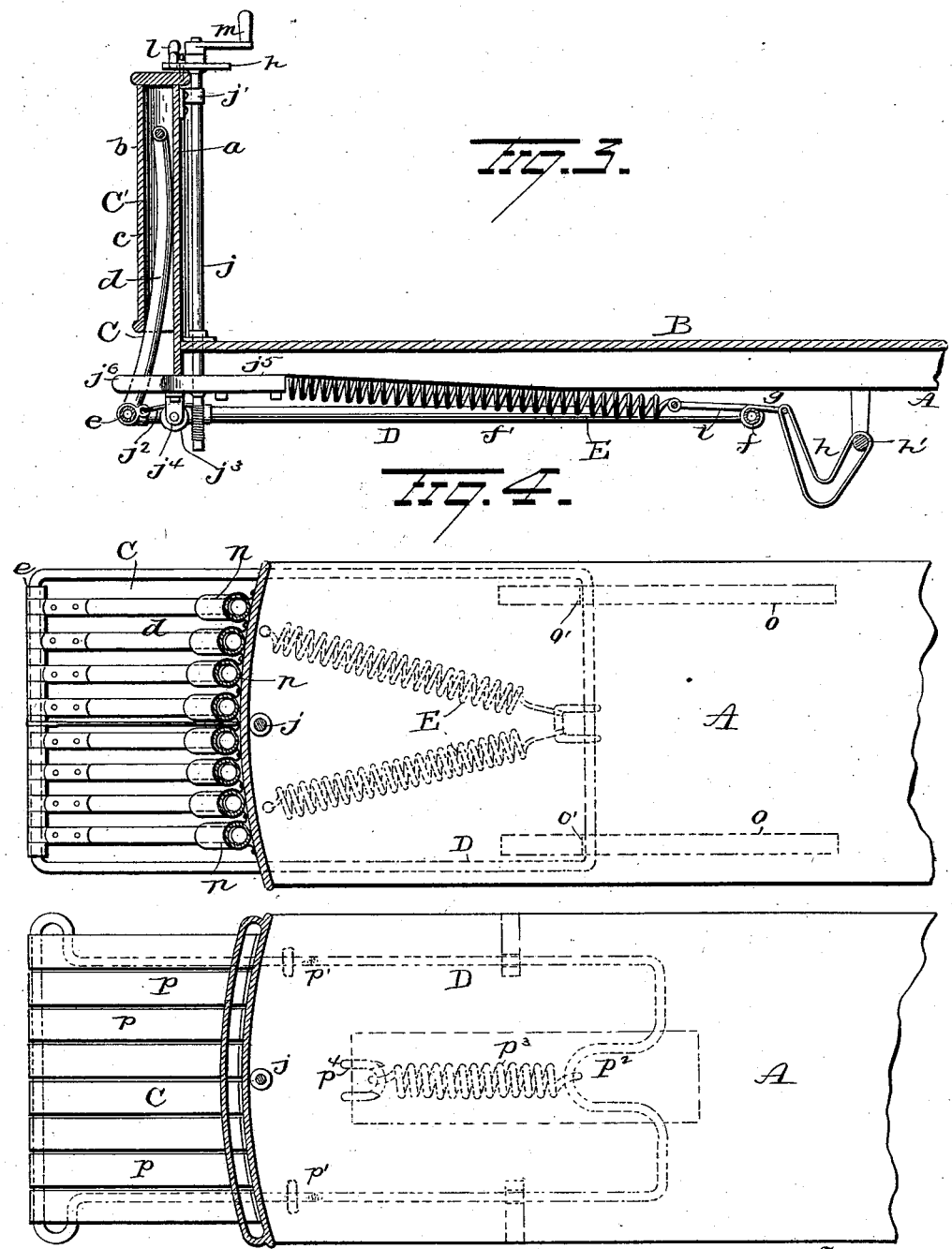

WILLIAM B. GEORGE, OF COLUMBUS, OHIO.

CAR-FENDER.

SPECIFICATION forming part of Letters Patent No. 531,374, dated December 25, 1894.

Application filed October 12, 1894. Serial No. 525,696. (No model.)

*To all whom it may concern:*

Be it known that I, WILLIAM B. GEORGE, a resident of Columbus, in the county of Franklin and State of Ohio, have invented certain new and useful Improvements in Car-Fenders; and I do hereby declare the following to be a full, clear, and exact description of the invention, such as will enable others skilled in the art to which it appertains to make and use the same.

My invention relates to an improvement in car fenders—the object of the invention being to produce means whereby a car fender can be so disposed as to be out of sight when its services are not required and so that it can be made to quickly assume its operative position when occasion requires.

A further object is to produce a car fender which shall be simple in construction, sure in operation and effectual, in all respects, in the performance of its functions.

With these objects in view the invention consists in certain novel features of construction and combinations and arrangements of parts as hereinafter set forth and pointed out in the claims.

In the accompanying drawings: Figure 1 is a plan view partly broken away to show hidden parts. Fig. 2 is a longitudinal sectional view showing the fender in its operative position. Fig. 3 is a similar view showing the positions of the parts when the fender is not in use. Figs. 4 and 5 are views illustrating modifications.

A represents the bottom of a car body, B the platform of the car, and C' the dash board. The dash board is made with two walls $a$, $b$ so as to produce an intermediate chamber or compartment $c$ for the reception of the fender C (as shown in Fig. 3) when said fender is not in use. The fender *per se* is composed of a series of, preferably curved, bars $d$, which may be made of metal, wood or other suitable material, said bars being loosely connected at their lower ends to the cross bar $e$ of a rectangular frame D, said frame being made of gas pipe or metal rods, and comprising, in addition to the front cross bar $e$, a rear cross bar $f$, and connecting side bars $f'$, said side bars being connected with the front bar by means of suitable elbows $f^2$.

The frame D extends rearwardly under the car bottom, and to the rear cross bar $f$ of said frame, a loop $g$ is secured whereby to attach a strap $h$ thereto, the other end of said strap being attached to a bar $h'$ secured to the car, the strap thus serving to limit the forward movement of the frame D.

Loops or eyes $i$ also project from the rear cross bar $f$, and to said loops or eyes two springs E, E, are attached, the forward ends of said springs being secured to the under side of the platform of the car in any suitable manner.

A vertical shaft $j$ is mounted in a bracket $j'$ secured to the dash board and passes through the floor of the platform of the car. A cord or chain $j^2$ is secured to the lower end of the shaft $j$ and adapted to be wound thereon, said cord or chain passing over a pulley $j^3$ and at its forward end is secured to the front cross bar of the fender frame. The pulley $j^3$ is mounted in a bracket $j^4$ fastened to a block or plate $j^5$ secured to the platform, and said block or plate is provided with an arm $j^6$ which projects forwardly between two of the bars of the fender and insures the proper vertical movement thereof. To the vertical shaft $j$ immediately above the dash board, a disk $k$ is secured and made with a series of perforations $k'$ for the reception of a dog $l$ pivoted to the dash board, whereby to retain the shaft and the fender in normal position. The shaft $j$ is provided with a crank $m$ whereby to turn the same.

When the fender is in its operative position, as shown in Fig. 2, and it is desired to raise the fender and cause it to enter the space between the walls of the dash board, it is simply necessary to turn the shaft $j$, whereupon the cord or chain $j^2$ will be wound on said shaft and the frame D pulled back against the resistance of the springs E, the bars composing the fender *per se* entering the space or chamber $c$ between the walls of the dash board. When the fender shall have been drawn up to the full extent, the dog $l$ will be dropped in one of the perforations $k'$ in the disk $k$ and the fender will be retained in its normal position. When it is desired to permit the fender to assume its operative position, the dog $l$ will be removed from the perforation in the disk $k$, whereupon the shaft $j$ would be released and the springs E would cause the fender to quickly shoot to its operative position.

Instead of the construction and arrangement of parts above described, that shown in Fig. 4 may be adopted. In this form of the invention, a separate compartment is provided for each bar of the fender by means of a series of tubes $n$ secured to the front of the fender. The fender frame is shown in Fig. 4 as guided by means of bars or guides $o$ secured under the car bottom. When this form of the invention is used, the block $j^5$ and arm $j^6$ may be dispensed with. The strap $h$ may also be omitted, the shoulders $o'$ on the guides serving to limit the forward movement of the fender.

Instead of making the bars of the fender round and of rod iron or wood, they may be made of strips of sheet metal $p$ as shown in Fig. 5. The side bars of the fender frame may be bent between their ends, as at $p'$, Fig. 5, and the rear cross bar of said fender frame may be made with a crank $p^2$ to which one end of a spring $p^3$ is attached, the other end of the spring being secured to a bracket $p^4$ secured to the car.

Various other slight changes might be made in the details of construction of my invention without departing from the spirit thereof or limiting its scope and hence I do not wish to limit myself to the precise details of construction herein set forth; but, Having fully described my invention, what I claim as new, and desire to secure by Letters Patent, is—

1. The combination with a car and a fender, of means for inclosing said fender in front of the car, substantially as set forth.

2. The combination with a car having a compartment at the end thereof, of a fender constructed and adapted to enter said compartment, substantially as set forth.

3. The combination with a car having a dash board constructed with two walls to produce an intermediate compartment, of a fender constructed and adapted to enter said compartment, substantially as set forth.

4. The combination with a car and a fender, of means for normally inclosing said fender in front of the car, and springs constructed and adapted to project said fender when released, substantially as set forth.

5. The combination with a car having a dash board constructed with a compartment, of a fender frame, and a fender composed of a series of bars connected to said frame and adapted to enter said compartment, substantially as set forth.

6. The combination with a car having a dash board constructed with a compartment, of a fender frame, a fender connected to said frame and adapted to enter said compartment, springs attached to said frame and to the car so as to project the fender when the latter is released, and means for limiting the forward movement of the fender frame, substantially as set forth.

7. The combination with a car having a dash board constructed with a compartment, of a fender frame, a fender connected to said frame and adapted to enter said compartment, springs secured at one end to said frame and at the other end to the car in front of the connection of said springs to the frame, a bar secured to the car in rear of said frame, and a strap connecting said bar and frame whereby to limit the movement of the latter, substantially as set forth.

8. The combination with a car having a dash board constructed with a compartment, of a fender frame, a fender connected to said frame and adapted to enter said compartment, springs connected with said frame and the car for projecting the fender, and an arm projecting from the car and between two bars of the fender whereby to guide the same, substantially as set forth.

9. The combination with a car having a dash board made with a compartment, of a fender adapted to enter said compartment, springs for projecting said fender when released, a vertical shaft, a cord or chain secured to the fender and adapted to wind on said shaft, and means for locking said shaft when the fender is in its inoperative position, substantially as set forth.

10. The combination with a car having a dash board made with a compartment, of a fender adapted to enter said compartment, springs for projecting said fender, a vertical shaft, a cord or chain secured to the fender and wound on said shaft, a perforated plate secured to the shaft, a dog pivoted to the dash board and adapted to enter a perforation in said plate, and a crank on said shaft, substantially as set forth.

11. The combination with a car having a dash board made with a compartment, of a fender adapted to enter said compartment, springs for projecting said fender when released, a vertical shaft, means for turning said shaft, a pulley mounted under the forward end of the car and a cord or chain secured at one end to the fender, passed over said pulley and wound on said vertical shaft, substantially as set forth.

In testimony whereof I have signed this specification in the presence of two subscribing witnesses.

WILLIAM B. GEORGE.

Witnesses:
    JOHN K. THOMAS,
    W. W. WOOD.